United States Patent [19]
Gallart et al.

[11] Patent Number: 5,165,951
[45] Date of Patent: Nov. 24, 1992

[54] GASIFIED CANDY, AND PROCESS AND APPARATUS FOR ITS MANUFACTURE

[76] Inventors: Ramon E. Gallart, C. Sebastian Altet, 6, 08190 Sant Cugat Del Valles; Ramon B. Turull, C. Urgell, 249, 08036 Barcelona, both of Spain

[21] Appl. No.: 760,562

[22] Filed: Sep. 16, 1991

[51] Int. Cl.$^5$ .............................................. A23G 3/00
[52] U.S. Cl. .................................... 426/572; 426/660
[58] Field of Search ................. 426/660, 572, 564, 658

[56] References Cited

U.S. PATENT DOCUMENTS

| | | | |
|---|---|---|---|
| 3,985,909 | 10/1976 | Kirkpatrick | 426/660 |
| 4,001,457 | 1/1977 | Hegadorn | 426/660 |
| 4,241,092 | 12/1980 | Halik et al. | 426/660 |
| 4,262,029 | 4/1981 | Kleiner et al. | 426/660 |
| 4,271,206 | 6/1981 | Fariel et al. | 426/660 |
| 4,272,558 | 6/1981 | Bouette | 426/660 |
| 4,273,793 | 6/1981 | Fariel et al. | 426/660 |
| 4,275,083 | 6/1981 | Colten et al. | 426/660 |
| 4,282,263 | 8/1981 | Barnes | 426/660 |
| 4,837,039 | 6/1989 | Gallart | 426/572 |
| 4,889,738 | 12/1989 | Hara | 426/660 |
| 4,952,417 | 8/1990 | Gallart | 426/572 |

*Primary Examiner*—Jeanette Hunter
*Attorney, Agent, or Firm*—Steinberg & Raskin

[57] ABSTRACT

The process is characterized in that the mass of candy has a humidity in the range between 0.1 and 5.5% and a viscosity in the range between 5,000 and 50,000 c.p.s., preferably between 14,000 and 16,000 c.p.s.

The apparatus is characterized in that the container which contains the candy mass in liquid or paste-like state is provided with an inlet for the gas in its lower part. It also comprises at least one crystallizing device, which includes a container in the interior of which there is located a refrigeration tube, and whose exterior is surrounded by a refrigeration device.

The candy has gas bubbles of a diameter comprised in the range between 0.1 and 0.3 mm, and is passed through a sieve of between 0.5 and 5 mm.

18 Claims, 3 Drawing Sheets

GASIFIED CANDY, AND PROCESS AND APPARATUS FOR ITS MANUFACTURE

The present invention refers to a process for manufacturing a gasified candy of the type which essentially consists of heating a mass of candy to a temperature in the range between 60 and 150 degrees centigrades in such a way that it becomes liquid or paste-like; in then placing the mass of candy in a container into which an inert gas is introduced in such a way that the gas is retained within said mass of candy; and in cooling the candy mass in a way that it solidifies retaining in its interior bubbles of gas.

It also refers to an apparatus of the type which includes at least one container which contains the candy mass in a liquid or paste-like state, into which container the gas is introduced to produce the gasified candy, and which also includes a stirring device in the interior of said container and means for cooling the gasified candy.

Finally the invention refers to the candy obtained using a process and apparatus of the type described. A high quality candy is obtained using the process and apparatus of the invention which achieves a viscosity and cooling optimum for obtaining a candy giving off the greatest number of poppings which also have an improved intensity.

BACKGROUND OF THE INVENTION

Several patents have been published concerning the production of candies, chewing gums and chocolates in which an inert gas is introduced during their liquid or paste-like state in order to either achieve products with a lower density and, therefore, lower cost in relation to volume, or to achieve different sensations. However in none of these cases the gas is retained within the mass in such a way that poppings are produced when the hollows created by the gas are broken.

The first patent which describes the introduction of a gas into a mass formed by a mixture of molten sugars which, on cooling, retains the occluded gas which gives off a crackling sound on being released was U.S. Pat. No. 3,012,893 presented on the Jan. 6th, 1959. In 1979 the same inventors of the present patent application cited for the first time the importance of the diameter of the bubbles of occluded gas in Spanish Patent No. 480,775 and in English Patent No. 2,048,643.

Since 1979 we have been investigating the mechanism for gasifying the candy in order to improve the quantity and intensity of poppings produced and in order to reduce the amount of candy wasted as a result of having a small quantity and low intensity of poppings.

We have also developed an objective system of control over the poppings, independent of differences in personal taste.

To improve the understanding of the different aspects of the present and previous patents which refer to gasified candies emitting poppings, the popping mechanism is outlined below, its control system being that described in U.S. Pat. No. 4,837,039.

Description of the popping mechanism

When a product is in a liquid state (dispersing medium) it is possible to spread a gas (dispersed phase) within the product without either substance penetrating the other: the result is what is known as "foam". When, later, the molten sugar or dispersing medium solidifies, with the gas or dispersed phase remaining inside, the resulting product is known as "solid foam".

U.S. Pat. No. 4,837,039 describes the consequences of variations in the surface tension of the bubble.

When there is a bubble within a mass of candy this means there is a film of candy of a certain thickness forming the bubble. This film separates the inert gas which is occluded at a high pressure from the exterior of the candy mass which is at atmospheric pressure.

The surface tension of the bubble of a solid foam, produced by mixing crystallized sugars at normal room temperature and which maintains the gas under pressure within the bubble, may be weakened in two ways:

1. By the introduction of the candy in the mouth. In this case the solid part of the bubble dissolves until the force due to the pressure of the occluded gas is superior to that of the film, which ruptures producing a popping.

Listening to the sound of a gasified soft drink one hears poppings of low intensity, given that these involve the rupture of bubbles with a low surface tension in comparison with the surface tension of crystallized sugars at normal room temperature.

2. By an increase in temperature. In this case, the increase in temperature reduces the strength of the surface tension of the bubble, and thereby allows the release of all or part of the occluded gas. The candy is then no longer suitable for sale to the public since when consumed it will not produce poppings.

There follow below some further considerations concerning the "popping".

The "popping" occurs when the candy film is ruptured as a result of the pressure of the occluded gas and a "sound" is produced. By "sound" is understood anything which stimulates the sense of hearing. This stimulation produces sensations caused by the succession of variations of atmospheric pressure which propagate through the air (sound), and these variations in pressure, on reaching the eardrum, cause it to vibrate, and the consequent vibrations of the eardrum are transmitted, transformed and elaborated by the ear until they arrive at the cortex in the form of bioelectrical energy: here the sensation of sound is produced.

The improvement in the analytic system of the poppings of the gasified candy has been achieved by adapting the analytic system to the reality of human consumption given that it is not the same thing to "hear" the poppings of a gasified candy introduced into a glass of water as it is to "hear" the poppings of a gasified candy introduced in the mouth. In the latter case the transmission mean is much more direct since the "popping" is transmitted directly from the mouth (which acts as a resonance chamber) to the middle ear across the eustachian tube which connects the the throat to the middle ear. The popping, then, is not "heard" via the external ear. On the other hand those who are present when someone else has a gasified candy in their mouth "hear" the popping via their external ear.

The analytic system which has been developed allows the intensity and quantity of poppings to be sensed in a way which resembles as closely as possible what is "heard" by a person when they place a gasified candy in their mouth.

At the same time this improved control system has allowed us to register graphically the poppings in both their quantity and their intensity, a procedure which has proved to be fundamental for our investigative study.

The most important factors enabling us to define the quality of a gasified candy are the following:
1. The quantity of poppings.
2. The intensity of poppings.
3. The time delay between the candy being placed in the mouth and poppings being produced.

1. The Quantity of Poppings

The more poppings the consumer notices the more he will appreciate the product. The main restriction lies in the fact that the consumer is not able to notice all of the poppings produced (through an analytic system, 200 poppings in 0.5 grams of product). Many of the poppings occur at the same time or with such a small time difference between them that it is not possible to discern two separate poppings.

On the other hand the quantity of bubbles depends on the viscosity of the mass and the stirring device (velocity and shape).

2. Intensity of The Popping

The intensity of the popping depends on the relation: pressure of occluded gas-resistance of the film of the bubble (composition of the sugars), and on the diameter of the bubble. For example if gasified sorbitol is compared with a mixture of sugars: sucrose-glucose-lactose 55:15:30, when both have the same diameter of bubble, the mixture of sugars produces a popping of far greater intensity than that produced by sorbitol alone.

The consumer basically defines the quality of a gasified candy by the intensity of the poppings.

As we have described in our English patent number 2,048,643 there are pieces of candy, in particular the bigger ones, which as well as giving off the characteristic poppings explode breaking into smaller pieces which continue to produce poppings.

The reason they "explode" is that they contain large bubbles which are in a metastable state due to the fact that their internal pressure is greater than the strength of the film which surrounds them.

The size of the bubble generated in a mass of molten candy, using the same installation, depends on the viscosity of the mass and the stirring device (type ad velocity).

3. Delay Time In Releasing Poppings

This depends on the solubility of the ingredients of the candy and, therefore, on the time which is needed to dissolve the outer covering of the candy. For example sorbitol is less soluble than sucrose or glucose and, as a result, takes longer to produce poppings (approximately 1-2 seconds more). In the case of the candy with sucrose, lactose and glucose the poppings are produced instantaneously on the candy being placed in the mouth.

There are then two factors which determine the quality of the final product: the quantity and the intensity of the poppings, and both these parameters depend on the viscosity of the molten candy mass at the time of gasification.

U.S. Pat. No. 2,289,794 describes the temperature of the molten candy mass as the factor influencing the bubble size. However temperature is not the only factor determining viscosity as will be seen below.

In Spanish Patent No. 480,775 there is described and claimed for the first time the diameter of the bubbles of the gasified candy, identifying that the best poppings are obtained with bubbles which have a diameter between 0.3-0.01 mm and that in the case of bubbles with small diameters the intensity of the "popping" is very small or practically non-existent.

It is clear then that the size of the bubble is a very important, although not the only, factor, as has been explained earlier, in determining the quality of the gasified candy.

In U.S. Pat. No. 4,289,794 is described how, in order to improve the popping through a larger bubble, the most appropriate working temperature is 280° F. In any event the popping or the diameter of the bubble do not depend exclusively on the temperature. According to the present invention the relation is the following:

Popping or bubble diameter-viscosity of the molten candy mass.

DESCRIPTION OF THE INVENTION

According to the invention the popping and the diameter of the bubble depend on the viscosity of the molten candy mass.

A product in a liquid state allows for the incorporation of a gas within it when the product has a low viscosity (e.g. 2,000 c.p.s.) (c.p.s.=centipoise). The bubbles coming from the base of the container and which pass through the mass have a rapid passage to the surface and in ascending join one with another to create larger bubbles which are not retained within the mass; it is to be additionally understood that the gas is insoluble in the candy mass.

While the viscosity of the mass of the candy increases the bubbles take longer to arrive to the surface and a higher proportion are retained within the mass. The slow rise of the bubbles allows them to be more effectively broken up by the stirring device.

The viscosity or fluidity of the molten candy mass depends fundamentally on:
a) Its dry matter content (humidity).
b) Its temperature.
c) The nature of its constituents.

a) The humidity content appropriate for the sugar mixtures lies between 1.0% and 5.5%. Humidity contents below 1.0% are not desirable because under such conditions the candy undergoes carbonation with the decomposition of some sugar. Equally humidity contents over 5.5% are not desirable since under these conditions the mass of candy does not have the capacity for retaining the gas as it has a lower surface tension. When sorbitol is employed the appropriate humidity is approximately 0.1% and under such circumstances the product does not undergo decomposition.

b) Temperature is a factor which influences directly the viscosity of the candy mass, but it is not the only one. For a given molten candy mass, the greater the temperature the lower the viscosity.

c) The consistency or viscosity of a molten candy mass will vary according to the nature and relative percentages of the ingredients. At a given temperature, viscosity varies according to the quantitative percentages of the ingredients. In a mixture of sucrose, lactose and fructose, an increase in the fructose content reduces viscosity while an increase in lactose increases it.

The gasification of the sugar mass at a predetermined viscosity of some 15,000 c.p.s. is produced by introducing the gas below the stirring device in such a way that on entering the mass the stirring device breaks up, cuts and disperses the incoming gas; the greater the viscosity of the sugar mass the slower the bubbles rise to the surface and the more time the stirring device has to break up the bubbles of the stream of incoming gas.

At a viscosity of 15,000 c.p.s. the majority of the bubbles have a diameter in the range 0.1 and 0.3 mm.

Once the mass has been appropriately gasified it is passed to a number of crystallizers which are in a vertical position using the known principle of employing differential pressures between containers.

The design of these crystallizers is extremely important, given that if the candy is not crystallized in optimum conditions it loses it characteristics.

The more rapidly the crystallization is produced the better the quality of the gasified candy: this can be achieved by increasing the contact surface when cooling any given mass of candy. However, this tendency is constrained by industrial requirements, labour costs, etc.

Using the present invention it has been possible to obtain the equilibrium point which allows for the production of industrial quantities together with an optimum quality of gasified candy.

This said result has been obtained with the crystallizer of the invention which is provided with an outer liner through which flows a refrigeration liquid, a cooling mixture, and is further provided with a pressure tube, in the centre of the tubular crystallizer, through which the refrigeration mixture also flows.

Refrigeration takes place, therefore, through the interior and the exterior of the container in which the candy mass is placed. This has the important advantage that it allows the utilization of large crystallizers, with a consequent increase in production, without diminishing the quality of the product, thus reducing the cost of the product.

In order to obtain a gasified candy of high quality, every point in the candy mass should be less than 400 mm from the cooling surface of either the external liner or the internal tube. Distances greater than this lead to a deterioration in the physicochemical and organoleptical qualities of the mass. The refrigerating liquid is kept at a temperature in the range between $+20°$ C. and $-25°$ C.

The mass of sugars which can be gasified is considerable and variable and basically depends on two factors:

1) That its viscosity at the time of gasification in the lower region of the reactor and below the stirring device is in the range 5,000 to 50,000 c.p.s., and preferably in the range 14,000 to 16,000 c.p.s. Under these conditions is achieved that a large number of the bubbles will have a diameter of between 0.1 and 0.3 mm.

2) That the candy film is capable of retaining the occluded gas at high pressure within the candy particles.

It is advantageous that lactose is present in the formula due to the fact that this sugar gives a higher resistance to the film. The quantity of lactose can fluctuate between 12-35% of the total candy mass depending on the other ingredients present.

It is also advantageous that the formula contains glucose since this sugar inhibits crystallization during gasification and racking. Glucose has this property since it is in fact not a single sugar but a mixture of different saccharides such as dextrose, maltose, trisaccharides, tetrasaccharides, hexasaccharides and higher polysaccharides.

In order to understand the effect of glucose it is important to remember that the sugar or processed sucrose is a non-crystallized and supersaturated product whose normal physical state is crystal, and that is returns to this state whenever the conditions are appropriate. If the sucrose molecules encounter difficulties in moving and orienting themselves due to the presence of other molecules then crystallization is avoided. Apart from this effect there is the additional one that a mixture of two products lowers the crystallization point: this principle is well known in physical chemistry. As a result of this, by mixing various products with sucrose we lower its ease and point of crystallization. The quantity of glucose may fluctuate between 5 and 25%.

In place of glucose, inverted sugar and fructose may be used even though these sugars have the disadvantage that they increase the price and the hygroscopicity of the final product. In cases where glucose is used in the mixture the quantity of fructose may vary between 5 and 35%.

As the inert gas it is possible to use a whole series of gases such as nitrogen, oxygen etc, but the gas which proves most practical and manageable is carbon dioxide. The pressure of the gas is comprised between 10 and 60 bars.

In order to obtain an optimum quality the mass of solidified candy is sieved through a mesh of between 0.5 and 5 mm.

BRIEF DESCRIPTION OF THE DRAWINGS

To improve understanding of this explanation it is accompanied by a number of drawings which, schematically and only with the status of non-limiting example, offer a specific practical embodiment.

In said drawings.

DESCRIPTION OF EMBODIMENTS OF THE INVENTION

In particular various embodiments of the crystallizer of the invention will be described below.

Figure 3:
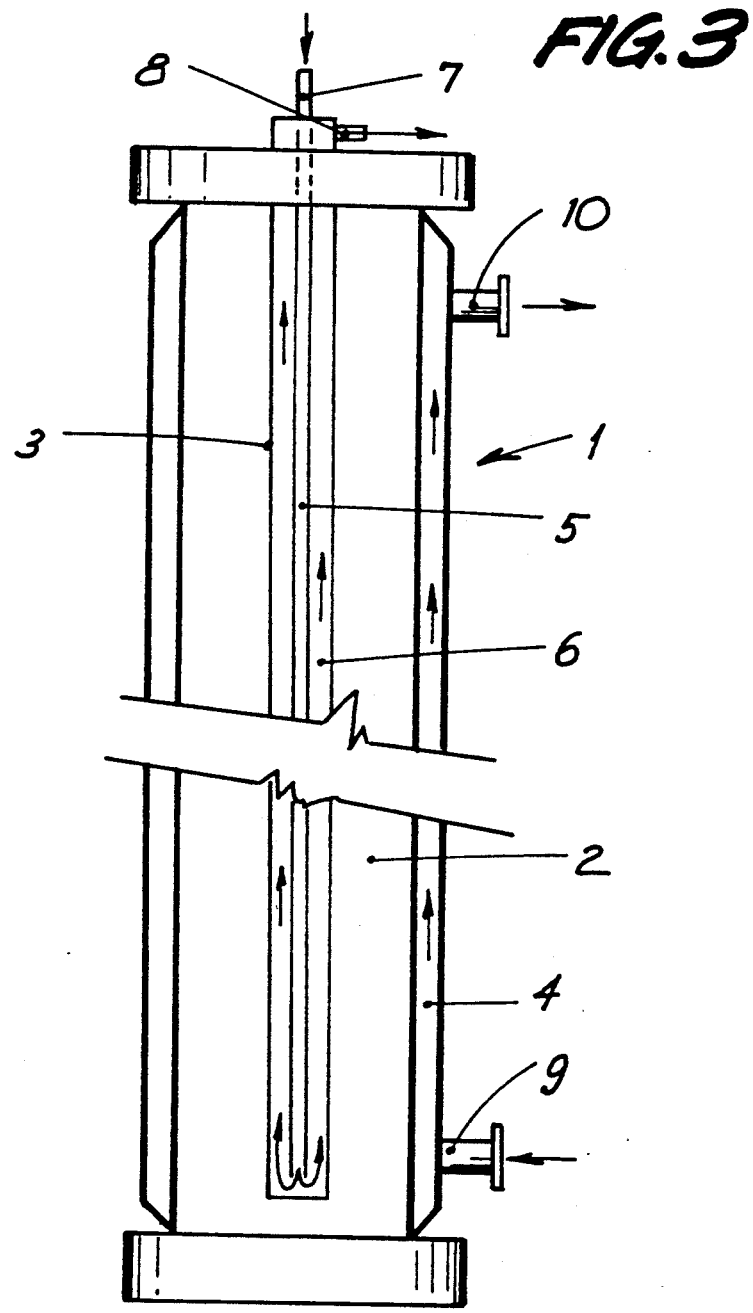
FIG. 3 is a longitudinal section of the crystallizer of the invention which is provided with an external refrigeration chamber.

The crystallizer device of FIG. 3 consists of a container -1- in whose interior -2- is located a refrigeration tube -3- and whose exterior is surrounded by a chamber -4- which is substantially cylindrical.

The refrigeration tube -3- contains in its interior a tube of smaller diameter -5- open at its lower end. The refrigerating liquid circulates by descending through the smaller diameter tube -5- and ascending through the chamber -6-, which is contained between the two tubes -3-and -5- as is indicated by the arrows, from an inlet -7-to an outlet -8-. The refrigerating liquid also circulates through the external chamber -4- in the direction indicated by the arrows from an inlet -9- to an outlet -10-.

As can be seen, the cooling of the candy mass located in the interior of the container -1- takes place both from the exterior and from the interior. If the condition that the distance of every point in the candy mass is less than 400 mm from the cooling surface is fulfilled, whether this be from the interior refrigeration tube -3-or from the external refrigeration chamber -4-, then it is understood that a high capacity for cooling the candy mass is available.

EXAMPLES

EXAMPLE 1

Sorbitol

This example refers to sorbitol monohydrate with a melting point of 100° C. This is a simple sugar with a low melting point.

Its viscosity at different temperatures has been determined using a viscometer UKRY 9 manufactured by Viscometers U.K. Ltd., and later it has been gasified at a variety of temperatures.

The results obtained are reproduced in Table I.

SUMMARY CHART

| Viscosity c.p.s. | Temperature in °C. | Gasification Result |
| --- | --- | --- |
| 200–2,000 | 125–90 | No gasification. Bubbles rise to the surface. |
| 2,000–6,000 | 90–80 | Partial gasification. Small bubbles. |
| 15,000 | 69 | Optimum gasification conditions. |
| >40,000 | <60 | Partial gasification. Large bubbles. |

TABLE I

| Temperatures in °C. | 52 | 53 | 54 | 55 | 56 | 57 | 58 | 59 | 60 | 61 | 62 | 63 | 64 | 65 | 66 | 67 |
| --- | --- | --- | --- | --- | --- | --- | --- | --- | --- | --- | --- | --- | --- | --- | --- | --- |
| Viscosities in thousands of c.p.s. | 98 | 90 | 72 | 70 | 63.13 | 56.04 | 49.48 | 44.15 | 39.22 | 35.12 | 31.38 | 28.44 | 25.68 | 22.91 | 20.95 | 18.99 |
| Temperatures in °C. | 68 | 69 | 70 | 71 | 72 | 73 | 74 | 75 | 76 | 77 | 78 | 79 | 80 | 81 | 82 | 83 |
| Viscosities in thousands of c.p.s. | 16.95 | 15.28 | 13.75 | 12.64 | 11.34 | 10.28 | 9.45 | 8.55 | 7.77 | 6.77 | 7.21 | 5.45 | 5.01 | 4.57 | 4.14 | 3.76 |
| Temperatures in °C. | 84 | 85 | 86 | 87 | 88 | 89 | 90 | 91 | 92 | 93 | 94 | 95 | 96 | 97 | 98 | 99 |
| Viscosities in thousands of c.p.s. | 3.44 | 3.13 | 2.88 | 2.63 | 2.43 | 2.30 | 2.05 | 1.86 | 1.72 | 1.58 | 1.47 | 1.33 | 1.25 | 1.15 | 1.04 | 0.96 |
| Temperatures in °C. | 100 | 101 | 102 | 103 | 104 | 105 | 106 | 107 | 108 | 109 | 110 | 111 | 112 | 113 | 114 | 115 |
| Viscosities in thousands of c.p.s. | 0.89 | 0.83 | 0.73 | 0.72 | 0.66 | 0.63 | 0.58 | 0.52 | 0.50 | 0.45 | 0.44 | 0.39 | 0.36 | 0.34 | 0.31 | 0.30 |
| Temperatures in °C. | | | | | | | | 116 | 117 | 118 | 119 | 120 | 121 | 122 | 123 | 124 |
| Viscosities in thousands of c.p.s. | | | | | | | | 0.28 | 0.26 | 0.25 | 0.23 | 0.22 | 0.21 | 0.20 | 0.19 | 0.18 |

Figure 1:
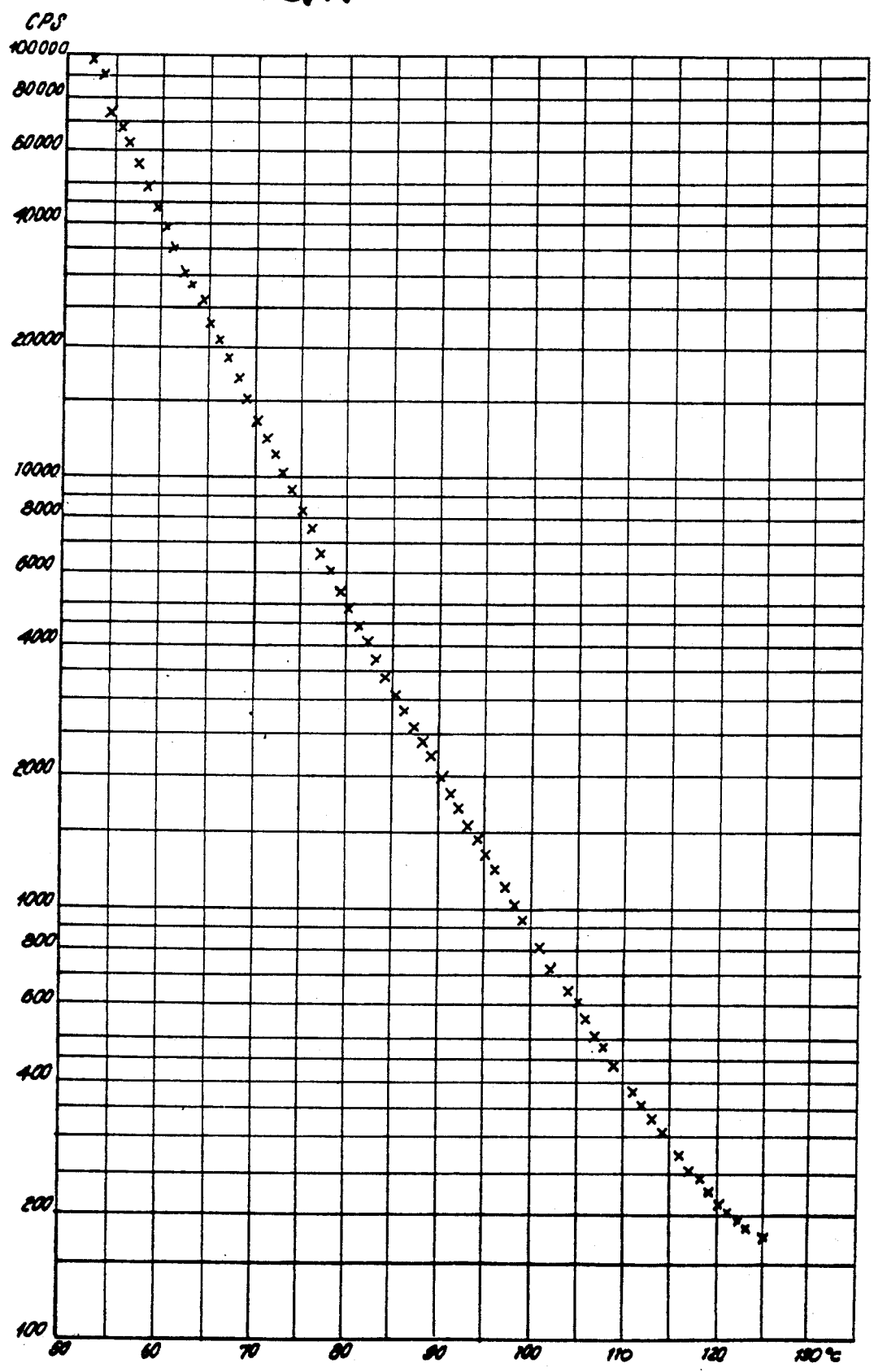
FIGS. 1 and 2 are two graphs which indicate the variation in viscosity (in c.p.s.) with temperature (in $°$C.) corresponding to the examples which will be described below.

Said table is represented graphically in semilogarithmic scale in FIG. 1.

Several gasification tests have been carried out at viscosities in the range between 80,000 and 200 c.p.s.

Between 200 and 2,000 c.p.s. (corresponding to a temperature in the range 125°–90° C.), the mass of sorbitol has a low viscosity (very liquid) and the bubbles are not retained with the consequence that the candy mass is not gasified.

Between 2,000 and 6,000 c.p.s. (corresponding to a temperature in the range 90°–80° C.) the sorbitol mass has a viscosity which allows gasification since a high proportion of the bubbles are retained occluded.

Between 6,000 and 25,000 c.p.s. (corresponding to a temperature in the range 80°–65° C.) the sorbitol mass has a suitable viscosity for obtaining optimal gasification.

For viscosities of greater than 40,000 c.p.s. (temperatures lower than 60° C.) it is not possible to gasify the mass.

The following chart summaries the above results:

As a general norm the best gasification results are obtained with high viscosities, up to certain limits.

EXAMPLE 2

Mixture of Sugars

Different mixtures of sugars have been used, for example a mixture of sucrose-lactose-glucose in the proportion 65:30:15, and with a humidity of 2% according to the method of K. F. (Karl Fisher).

The viscosity has been measured under the same conditions and with the same instrument as in the case of sorbitol.

The result obtained are summarized in Table II.

TABLE II

| Temperatures in °C. | 100 | 101 | 102 | 103 | 104 | 105 | 106 | 107 | 108 | 109 | 110 | 111 | 112 | 113 |
| --- | --- | --- | --- | --- | --- | --- | --- | --- | --- | --- | --- | --- | --- | --- |
| Viscosities in thousands of c.p.s. | 94.22 | 87.22 | 82.08 | 74.14 | 69.17 | 58.84 | 55.63 | 49.32 | 44.47 | 37.16 | 35.85 | 33.74 | 30.54 | 29.65 |
| Temperatures in °C. | 114 | 115 | 116 | 117 | 118 | 119 | 120 | 121 | 122 | 123 | 124 | | | |
| Viscosities in thousands of c.p.s. | 26.95 | 24.10 | 21.96 | 19.74 | 17.82 | 16.62 | 15.06 | 13.14 | 11.98 | 10.80 | 9.46 | | | |

Figure 2:
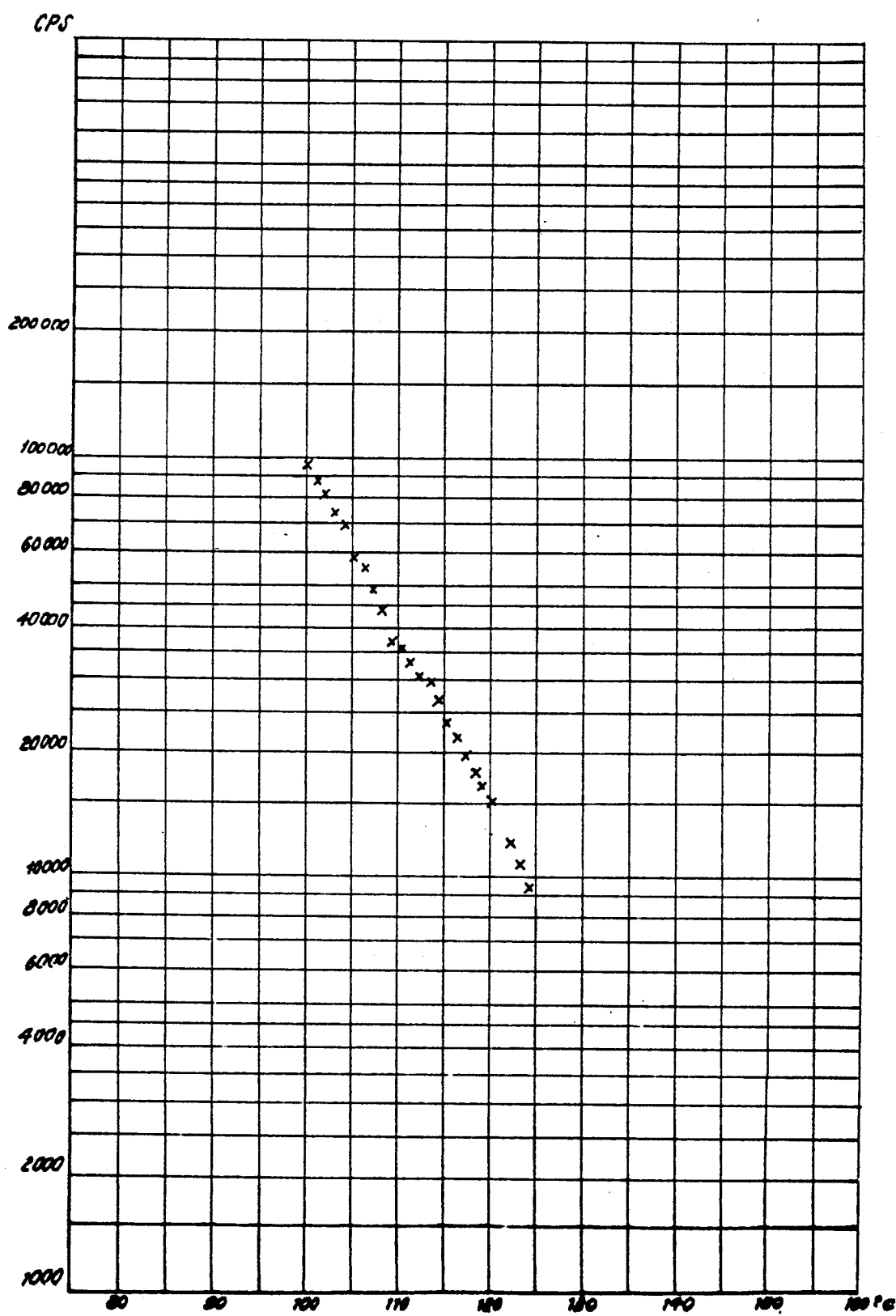

Said table is represented graphically in semi-logarithmic scale in FIG. 2.

Various gasification tests have been carried out which are summarized in the following chart:

| Viscosity c.p.s. | Temperature in °C. | Gasification Result |
| --- | --- | --- |
| 7,000 | 130 | Little gasification. Small bubbles. |
| 15,000 | 120 | Product well gasified. Even bubbles. Optimum product. |
| 40,000 | 110 | Product gasified with large bubbles. Mechanical problems in agitating when gasifying. |

After gasification the procedure is identical to that described in example 1.

On the basis of the explanation offered in examples 1 and 2 it can be clearly appreciated that the optimum gasification of a mass of candy is best obtained by controlling viscosity rather than controlling temperature given that, in the case of sorbitol, for example, the optimum gasification temperature is 69° C., whilst in the case of a sucrose-lactose-glucose mixture (65:30:15) the optimum gasification temperature is 120° C. In contrast at viscosities in the region of 15,000 c.p.s. both products can be optimally gasified.

We claim:

1. A process for obtaining gasified candy which comprises heating a mass of candy to a temperature in the range between 60° C. and 150° C. so that it attains a humidity in the range between 0.1 and 5.5% and a viscosity in the range between 5,000 and 50,000 c.p.s; placing the mass of candy in a container; introducing an inert gas under pressure into the container such that the inert gas is retained in said candy mass; and cooling the candy mass by passing the candy mass into an interior portion of a crystallizer cooled by refrigerating liquid enclosed within said interior portion of said crystallizer and surrounding an exterior of said crystallizer so that it solidifies while retaining internally bubbles of gas having a diameter in the range between 0.1 and 0.3 mm.

2. A process according to claim 1, further comprising introducing the gas through the lower part of the container holding the candy mass.

3. A process according to claim 1 wherein the viscosity of the candy mass is between 14,000 and 16,000 c.p.s.

4. A process according to claim 1 characterised in that the bubbles have an optimum diameter in the range between 0.1 and 0.3 mm.

5. A process according to claim 1, further comprising sieving the solidified candy mass through a mesh of gauge 0.5 to 5 mm.

6. A process according to claim 1 characterised in that the candy mass is cooled in crystallizers in which the refrigerating liquid is maintained at a temperature in the range between +20° C. and −25° C.

7. A process according to claim 1 characterised in that the candy mass comprises a mixture of sugars which contains glucose and/or inverted sugar in a proportion in the range between 5 and 25%.

8. A process according to claim 1 characterised in that the candy mass comprises a mixture of sugars which contains fructose in a proportion in the range between 5 and 35%, in the event that it does not contain glucose and/or inverted sugar.

9. A process according to claim 1 characterised in that the inert gas used is carbon dioxide.

10. A process according to claim 1, further comprising introducing the inert gas in the candy mass at a pressure in the range between 10 and 27 bar.

11. The candy obtained according to the process of claim 1.

12. The process according to claim 7, wherein the candy mass includes lactose in a proportion in the range between 12 and 35%.

13. Candy obtained according to the process of claim 5.

14. An apparatus for obtaining gasified candy, comprising
at least one container having an interior which contains the candy mass in a liquid or paste-like state, said container including means for introducing gas into the container in order to obtain the gasified candy, said container including a stirring device in the interior of said container, said means for introducing gas having an inlet for introducing the gas below said stirring device, and
a crystallizer for rapidly cooling the gasified candy, said crystallizer including an interior into which the gasified candy is introduced, said crystallizer including a cylindrically-shaped refrigeration tube located in said interior of said crystallizer, a refrigerating liquid circulating in said refrigeration tube, and a refrigerating device arranged around an exterior of said crystallizer, said refrigerating device having a chamber including a refrigerating liquid, said refrigerating liquid being circulated at a temperature such that the gasified candy solidifies while retaining internally bubbles of gas having a diameter in the range between 0.1 and 0.3 mm.

15. An apparatus according to claim 14 characterised in that the refrigeration tube located inside the container comprises in its interior a tube of smaller diameter, open at its lower end, the refrigerating liquid circulating downwards through the smaller diameter tube and upwards through the chamber located between the two tubes.

16. An apparatus according to claim 14 characterised in that the refrigerating device which surrounds the container of the crystallizer comprises a chamber which is substantially cylindrical.

17. An apparatus according to claim 14 characterised in that the distance of every point of the candy from the cooling surface, either the interior refrigeration tube or the external refrigeration device, is less than 400 mm.

18. The apparatus of claim 14, wherein the refrigerating liquid contained in said refrigeration tube and within said refrigeration chamber of said refrigeration device is maintained at a temperature in the range between +20° C. and −25° C.

* * * * *